(12) United States Patent
Nojiri et al.

(10) Patent No.: US 9,281,776 B2
(45) Date of Patent: Mar. 8, 2016

(54) POWER CONVERSION APPARATUS INCLUDING DIFFERENT VOLTAGE-TYPE BRIDGE CIRCUITS

(75) Inventors: Yuji Nojiri, Chiyoda-ku (JP); Masanori Kato, Chiyoda-ku (JP); Akira Imanaka, Chiyoda-ku (JP); Masaya Harakawa, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 268 days.

(21) Appl. No.: 13/982,145

(22) PCT Filed: Jan. 31, 2011

(86) PCT No.: PCT/JP2011/051943
§ 371 (c)(1),
(2), (4) Date: Jul. 26, 2013

(87) PCT Pub. No.: WO2012/104969
PCT Pub. Date: Aug. 9, 2012

(65) Prior Publication Data
US 2013/0307500 A1  Nov. 21, 2013

(51) Int. Cl.
*H02P 31/00* (2006.01)
*H02M 7/5387* (2007.01)
*H02M 1/00* (2007.01)

(52) U.S. Cl.
CPC .......... *H02P 31/00* (2013.01); *H02M 7/53873* (2013.01); *H02M 2001/0051* (2013.01); *Y02B 70/1483* (2013.01); *Y02B 70/1491* (2013.01)

(58) Field of Classification Search
CPC ..................................................... H02P 31/00
See application file for complete search history.

(56) References Cited

U.S. PATENT DOCUMENTS

| | | | |
|---|---|---|---|
| 8,159,847 B2 * | 4/2012 | Viitanen et al. | 363/98 |
| 2004/0089934 A1 | 5/2004 | Shimoida et al. | |
| 2009/0195068 A1 * | 8/2009 | Ohashi et al. | 307/18 |

(Continued)

FOREIGN PATENT DOCUMENTS

| | | |
|---|---|---|
| JP | 06-090578 A | 3/1994 |
| JP | 2000-224867 A | 8/2000 |

(Continued)

OTHER PUBLICATIONS

International Search Report for PCT/JP2011/051943 dated Apr. 12, 2011.

(Continued)

*Primary Examiner* — Emily P Pham
(74) *Attorney, Agent, or Firm* — Sughrue Mion, PLLC; Richard C. Turner

(57) ABSTRACT

A power conversion apparatus includes a power-conversion circuit unit that includes at least two voltage-type bridge circuits of an upper and lower arm configuration including switching elements connected in series, each of the switching elements including a transistor and a free wheel diode connected to the transistor in inverse parallel. Each of the voltage-type bridge circuits is configured to include, as the free wheel diodes: a SiC-SBD (SiC-Schottky-Barrier Diodes) in both upper and lower arms; a SiC-SBD only in the upper arm; a SiC-SBD only in the lower arm; or a diode other than the SiC-SBD in both the upper and lower arms; and the power-conversion circuit unit is configured by combining at least two configurations among the four configurations for the voltage-type bridge circuits.

18 Claims, 12 Drawing Sheets

(56) References Cited

U.S. PATENT DOCUMENTS

2010/0265746 A1* 10/2010 Ishikawa et al. .............. 363/131
2010/0309700 A1* 12/2010 Maeda et al. ................. 363/126
2010/0320557 A1* 12/2010 Miyoshi et al. ............... 257/476
2013/0169035 A1*  7/2013 Nakashima ............. H02M 1/32
                                                                 307/9.1

FOREIGN PATENT DOCUMENTS

| JP | 2003-189668 A | 7/2003 |
|----|---------------|--------|
| JP | 2003-219687 A | 7/2003 |
| JP | 2004-140068 A | 5/2004 |
| JP | 2009-183115 A | 8/2009 |
| JP | 2011-004243 A | 1/2011 |
| WO | 97/01209 A1   | 1/1997 |

OTHER PUBLICATIONS

Communication dated Mar. 30, 2015, issued by the State Intellectual Property Office of P.R. China in counterpart Chinese application No. 201180066413.4.

* cited by examiner

FIG.3
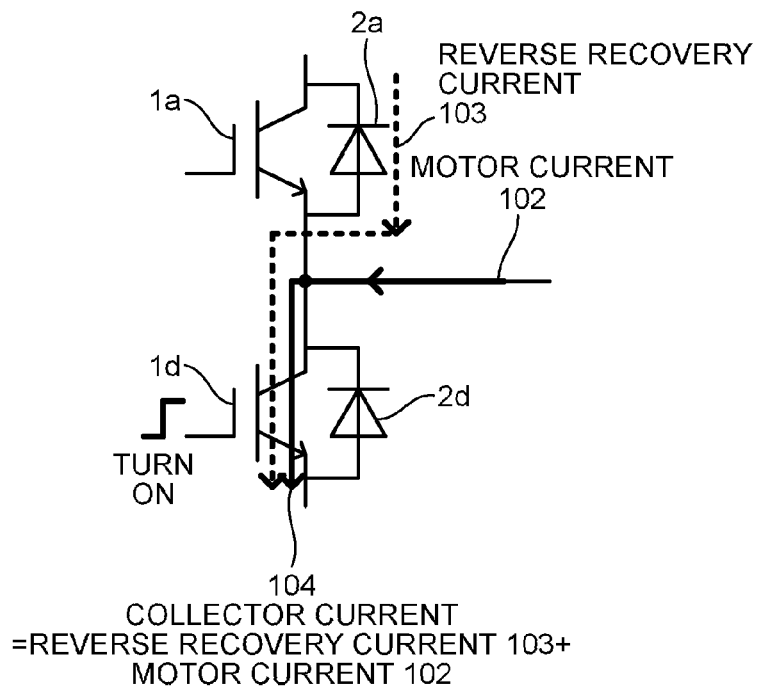
COLLECTOR CURRENT
=REVERSE RECOVERY CURRENT 103+
MOTOR CURRENT 102
FIG.4
(a) TURN-ON WAVEFORM OF 1d
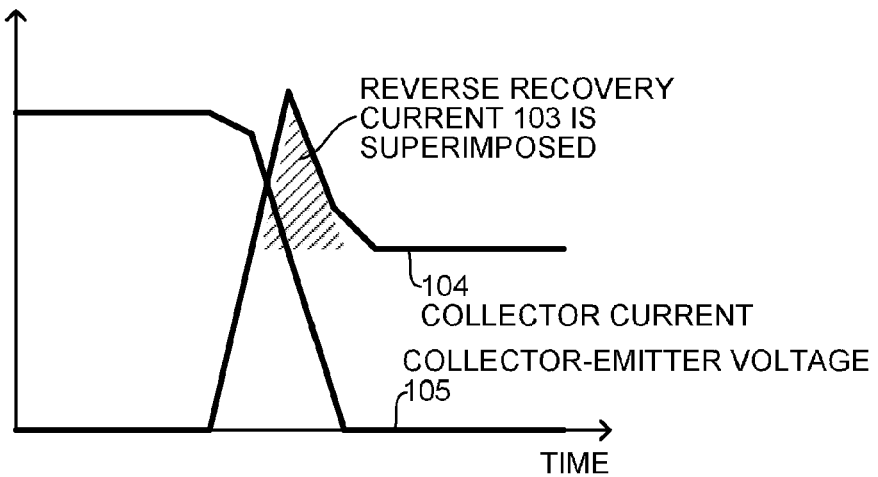
(b) TURN-ON LOSS WAVEFORM OF 1d

FIG.7
(a) TURN-ON WAVEFORM OF 1d
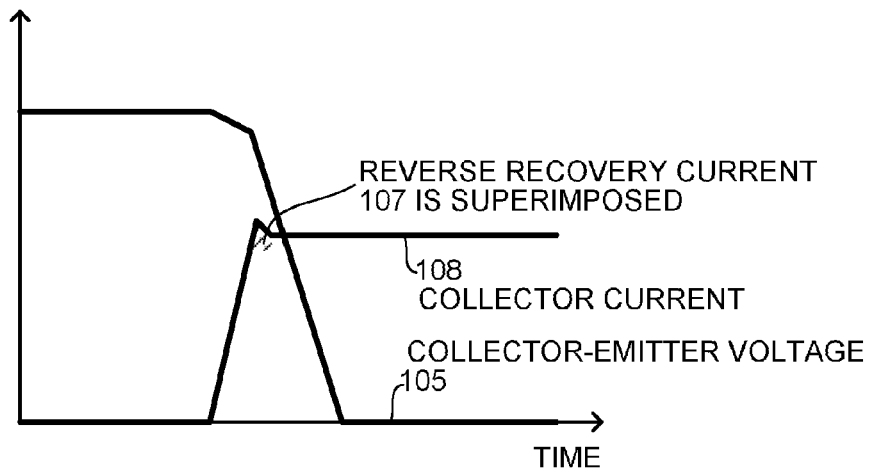
(b) TURN-ON LOSS WAVEFORM OF 1d
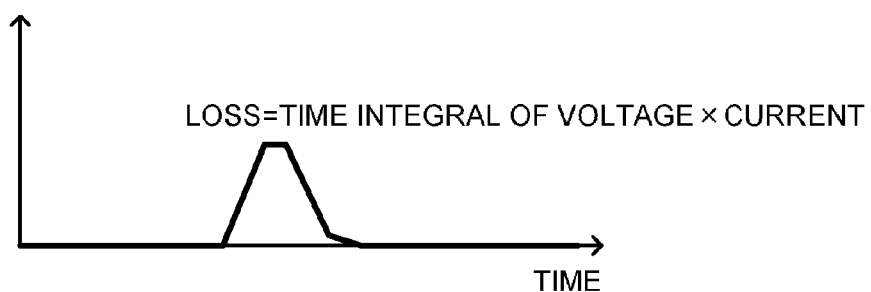
FIG.8
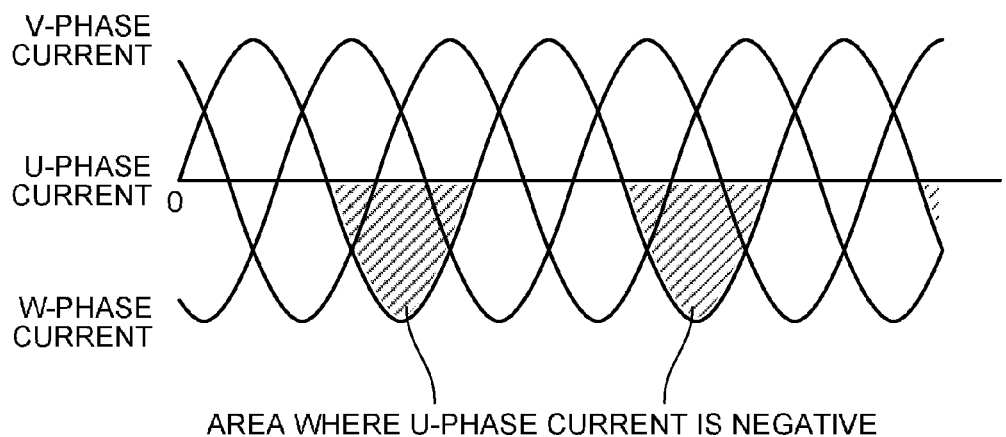

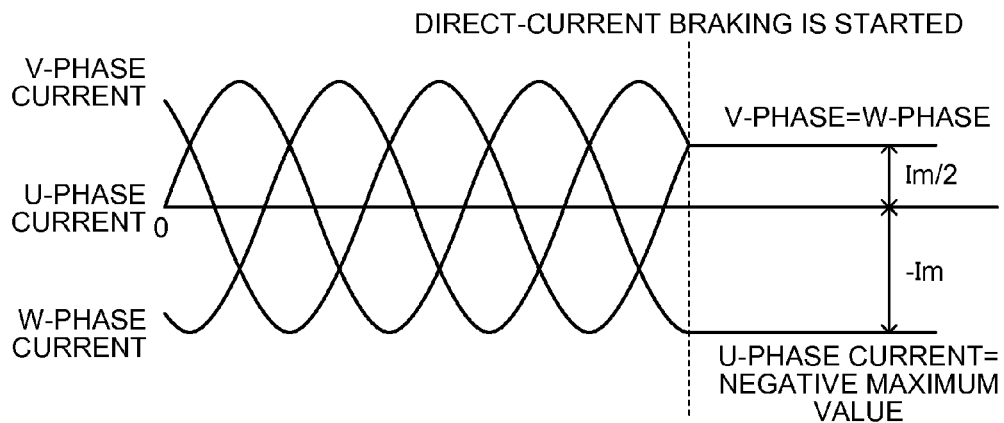
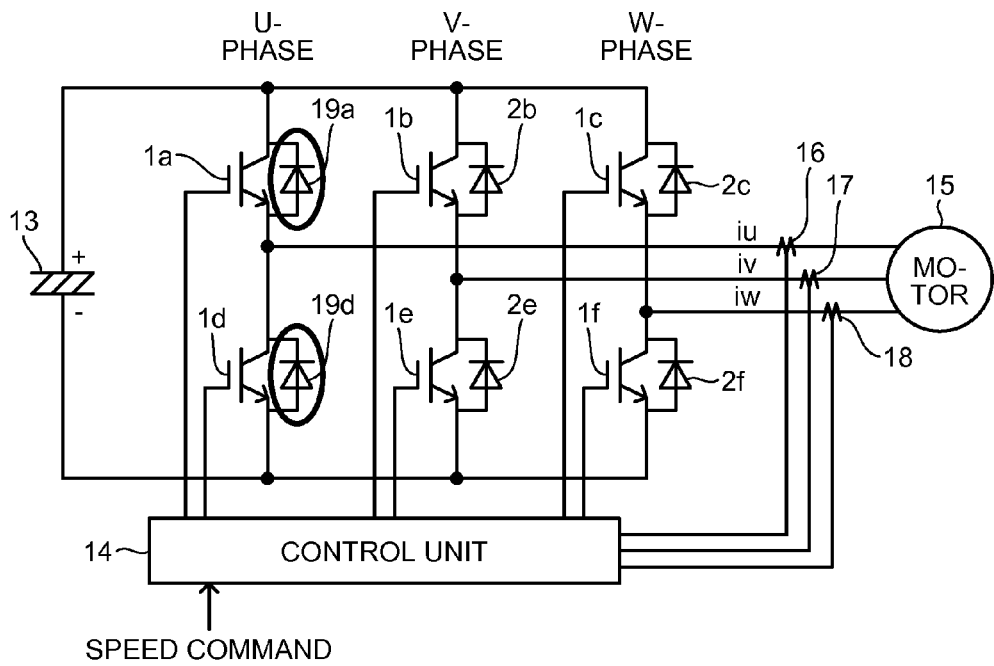

POWER CONVERSION APPARATUS INCLUDING DIFFERENT VOLTAGE-TYPE BRIDGE CIRCUITS

This is a National Stage Entry of Application No. PCT/JP2011/051943 filed Jan. 31, 2011, the contents of all of which are incorporated herein by reference in their entirety.

FIELD

The present invention relates to a power conversion apparatus.

BACKGROUND

In a conventional power conversion apparatus, high efficiency and an increase in the size of a cooler have been sought in order to secure reliability against thermal destruction caused by losses of a transistor and a free wheeling diode. Meanwhile, SiC (silicon carbide) has been attracting attentions, which has a lower loss and higher efficiency than Si (silicon), so that there has been an expectation of an application of SiC to power conversion apparatuses with high efficiency and reliability.

For example, in Patent Literature 1 mentioned below, a SiC-JFET is employed as a transistor included in a power conversion apparatus (an inverter) and a SiC-SBD (a Schottky-barrier diode) is employed as a free wheeling diode connected to the SiC-JFET in inverse parallel.

CITATION LIST

Patent Literature

Patent Literature 1: Japanese Patent Application Laid-open No. 2000-224867

SUMMARY

Technical Problem

However, because SiC is considerably expensive as compared to Si, when SiC is applied to all free wheeling diodes as described in the Patent Literature 1 mentioned above, there is a problem of a cost increase.

The present invention has been made in view of the above problem, and an object of the present invention is to provide a power conversion apparatus capable of securing the reliability against thermal destruction and achieving high efficiency while suppressing a cost increase.

Solution to Problem

To solve the above problems and achieve the object, according to an aspect of the present invention a power conversion apparatus includes a power-conversion circuit unit that includes at least two voltage-type bridge circuits of an upper and lower arm configuration including switching elements connected in series, each of the switching elements including a transistor and a free wheel diode connected to the transistor in inverse parallel. Each of the voltage-type bridge circuits is configured to include, as the free wheel diodes, a SiC-SBD (SiC-Schottky-Barrier Diodes) in both upper and lower arms; a SiC-SBD only in the upper arm; a SiC-SBD only in the lower arm, or a diode other than the SiC-SBD in both the upper and lower arms, and the power-conversion circuit unit is configured by combining at least two configurations among the four configurations for the voltage-type bridge circuits.

Advantageous Effects of Invention

According to the power conversion apparatus of the present invention, it is possible to secure the reliability on thermal destruction and achieve high efficiency while suppressing a cost increase.

BRIEF DESCRIPTION OF DRAWINGS

FIG. 2 depicts a flow of a current in a conventional technique before a transistor 1$d$ is turned on.

FIG. 3 depicts a flow of a current in the conventional technique after the transistor 1$d$ is turned on.

FIG. 4 are explanatory diagrams of an increase of a turn-on loss in the conventional technique when the transistor 1$d$ is turned on.

FIG. 5 depicts a flow of a current in the first embodiment before the transistor 1$d$ is turned on.

FIG. 6 depicts a flow of a current in the first embodiment after the transistor 1$d$ is turned on.

FIG. 7 are explanatory diagrams of an increase of a turn-on loss in the first embodiment when the transistor 1$d$ is turned on.

FIG. 8 depicts a loss reduction area according to the first embodiment as viewed from a three-phase current waveform.

FIG. 13 is an explanatory diagram of a control timing in a third embodiment at the time of performing direct-current braking.

FIG. 14 is another configuration example of the power conversion apparatus according to the third embodiment.

DESCRIPTION OF EMBODIMENTS

Exemplary embodiments of a power conversion apparatus according to the present invention will be explained below in detail with reference to the accompanying drawings. The present invention is not limited to the embodiments.

First Embodiment

Figure 1:
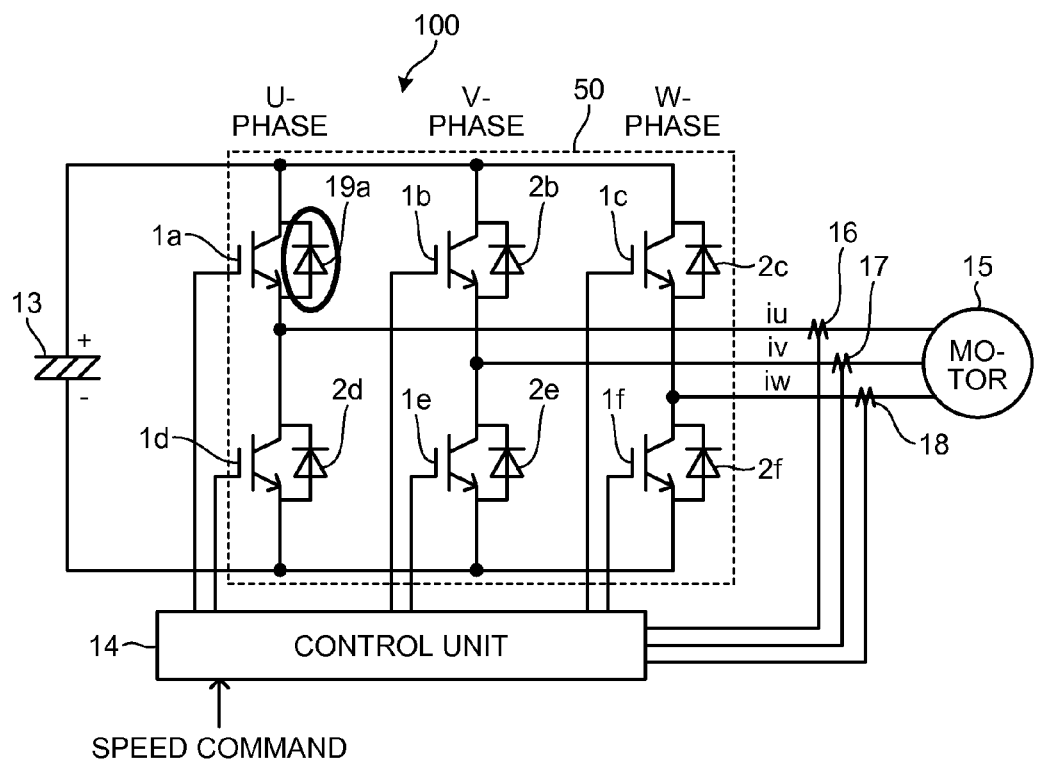
FIG. 1 depicts a configuration of a power conversion apparatus according to a first embodiment.

FIG. 1 depicts a configuration of a power conversion apparatus according to a first embodiment. As shown in FIG. 1, a power conversion apparatus 100 according to the first embodiment includes, as main constituent units, a power-conversion circuit unit 50, a smoothing capacitor 13, and a control unit 14.

The power-conversion circuit unit 50 constitutes three phases (a U-phase, a V-phase, and a W-phase) connected to the smoothing capacitor 13 in parallel, with a voltage-type bridge circuit of an upper and lower arm configuration including switching elements connected in series as one phase, where each of the switching elements includes a transistor and a free wheeling diode connected to the transistor in inverse parallel. For example, a U-phase upper arm is made as a free wheeling diode 19a is connected to a transistor 1a in inverse parallel, and a U-phase lower arm is made as a free wheel diode 2d is connected to a transistor 1d in inverse parallel. The V-phase and the W-phase have the same configuration, in which a V-phase upper arm is made as a free wheeling diode 2b is connected to a transistor 1b in inverse parallel, a V-phase lower arm is made as a free wheeling diode 2e is connected to a transistor 1e in inverse parallel, a W-phase upper arm is made as a free wheeling diode 2c is connected to the transistor 1c in inverse parallel, and a W-phase lower arm is made as a free wheeling diode 2f is connected to a transistor 1f in inverse parallel. In the following explanations, when describing a relationship between these respective arms, it is assumed that the upper arm and the lower arm in each phase have a relation of an inverse arm, and an arm of one phase and an arm of another phase have a relation of facing arms.

A connecting portion of the upper arm and the lower arm of each phase forms an output terminal (an alternate-current output terminal) of the power-conversion circuit unit 50, and a motor 15 is connected to these output terminals. The motor 15 that is a load (a driving target) is connected to the output terminals (alternate-current output terminals) of the power-conversion circuit unit 50, and current sensors 16 to 18 that detect current information flowing between the power-conversion circuit unit 50 and the motor 15 are connected between the power-conversion circuit unit 50 and the motor 15. The current sensor 16 detects a current flowing through the U-phase (iu), the current sensor 17 detects a current flowing through the V-phase (iu), and the current sensor 18 detects a current flowing through the W-phase (iw). The current information detected by the current sensors 16 to 18 is input to the control unit 14.

The control unit 14 acquires the magnitude of the current and phase information based on the current information detected by the current sensors 16 to 18. The control unit 14 then converts a speed command supplied from outside into a voltage command of each phase, compares the converted voltage command with a triangular wave, determines a switch-on time of each switching element, that is, a switching command, based on whether a difference as a result of the comparison is positive or negative, and supplies the switching command to a switching element included in the power-conversion circuit unit 50.

In the power-conversion circuit unit 50 to which the switching command described above is supplied, a direct-current voltage charged in the smoothing capacitor 13 is modulated into a pulse having a predetermined width by switching elements of the upper and lower arms constituting the voltage-type bridge circuit, and the switching elements are on-off operated in a complementary manner for each phase such that a quasi-sinusoidal wave of a predetermined voltage and a predetermined frequency is supplied to the motor 15. This type of driving method is referred to as "PWM driving", and the voltage applied is referred to as "PWM voltage".

The gist of the power conversion apparatus according to the first embodiment is in a feature that a free wheeling diode of one of six arms constituting the U-phase to the W-phase is configured with a SiC-SBD. To specifically explain this configuration, in the configuration shown in FIG. 1, the transistors 1a to 1f are, for example, a Si-IGBT (Si-Insulated Gate Bipolar Transistors), and the free wheeling diodes 2b to 2f are, for example, a Si-FRD (Si-Fast Recovery Diode). On the other hand, the free wheeling diode 19a encircled by a thick solid line is a SiC-SBD (SiC-Schottky-Barrier Diode). That is, a free wheeling diode of any one of the upper arm or the lower arm in one phase of the voltage-type bridge circuit (the free wheeling diode 19a of the U-phase arm in the configuration shown in FIG. 1) is configured with a SiC-SBD, and the rest of the free wheeling diodes (the free wheeling diodes 2b to 2f of the arms other than the U-phase upper arm in the configuration shown in FIG. 1) are configured with a diode other than a SiC-SBD (for example, a Si-FRD). With this configuration, it is possible to reduce a conduction loss and a reverse recovery loss of the SiC-SBD and a turn-on loss of the corresponding switching element (the transistor 1d in the configuration shown in FIG. 1).

Figure 2:
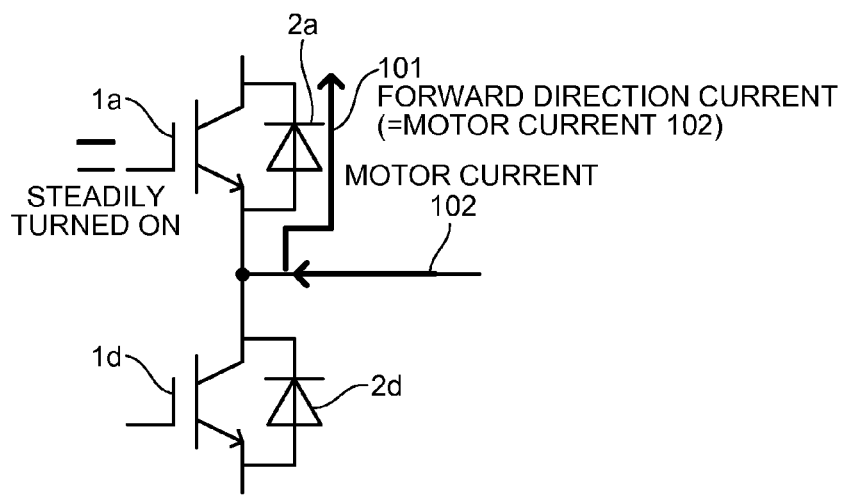

The reason why the conduction loss, the reverse recovery loss, and the turn-on loss are reduced in the power conversion apparatus according to the first embodiment will be explained next with reference to FIGS. 2 to 4. FIGS. 2 to 4 depict various waveforms when the free wheeling diode 2a of the U-phase upper arm is configured with a Si-FRD, that is, all the free wheeling diodes in the power-conversion circuit unit 50 are configured with a Si-FRD. To explain this configuration more specifically: FIG. 2 depicts a flow of a current in a conventional technique before the transistor 1d is turned on; and FIG. 3 depicts a flow of a current in the conventional technique after the transistor 1d is turned on. FIG. 4 are explanatory diagrams of an increase of a turn-on loss in the conventional technique when the transistor 1d is turned on, where (a) depicts waveforms of a collector current 104 and a collector-emitter voltage 105 after the transistor 1d is turned on, and (b) depicts a waveform of the loss after the transistor 1d is turned on.

First, the loss regarding a transistor includes a conduction loss generated by a current that flows steadily and a switching loss generated by a switching operation. The switching loss can be divided into a turn-on loss generated when the state of the transistor is changed from off to on, and a turn-off loss generated when the state of the transistor is changed from on to off.

Meanwhile, the loss regarding the free wheeling diode includes the conduction loss generated by a current that flows steadily and a reverse recovery loss generated by a reverse recovery current that flows by a turn-on switching of a switching element of an inverse arm in the same phase of the voltage-type bridge circuit. These losses regarding the switching element and the free wheeling diode may cause not only a reduction of efficiency but also a degradation of the reliability of the apparatus due to thermal destruction or the like. Therefore, it is preferred that these losses are reduced as much as possible.

FIG. 2 depicts a state where a motor current 102 flows into a connecting portion of the upper arm and the lower arm, and a direction of the current shown in FIG. 2 is referred to as "negative polarity". In this case, when the transistor 1a is steadily turned on, the motor current 102 flows as it is to a forward direction current 101 that flows through the free wheeling diode.

Next, as shown in FIG. 3, when the transistor 1a is turned off from the state shown in FIG. 2 and the transistor 1d is turned on, a reverse recovery current 103 as indicated by a thick dashed line flows due to a reverse recovery operation of the free wheeling diode 2a. Therefore, on the collector current 104 of the transistor 1d, the reverse recovery current 103 indicated by the thick dashed line is superimposed in addition to the motor current 102 indicated by the thick solid line. At this time, because the reverse recovery current 103 of the free wheeling diode 2a is superimposed on the collector current 104 that flows through the transistor 1d, the turn-on loss is increased by an amount of the reverse recovery current 103 (a hatched part in FIG. 4(a) corresponds to this increase).

Figure 5:
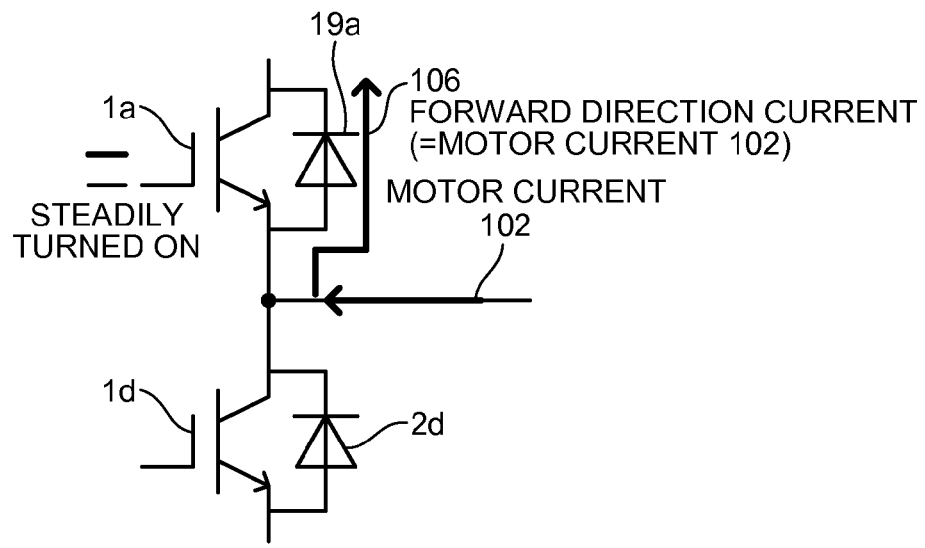
Figure 6:
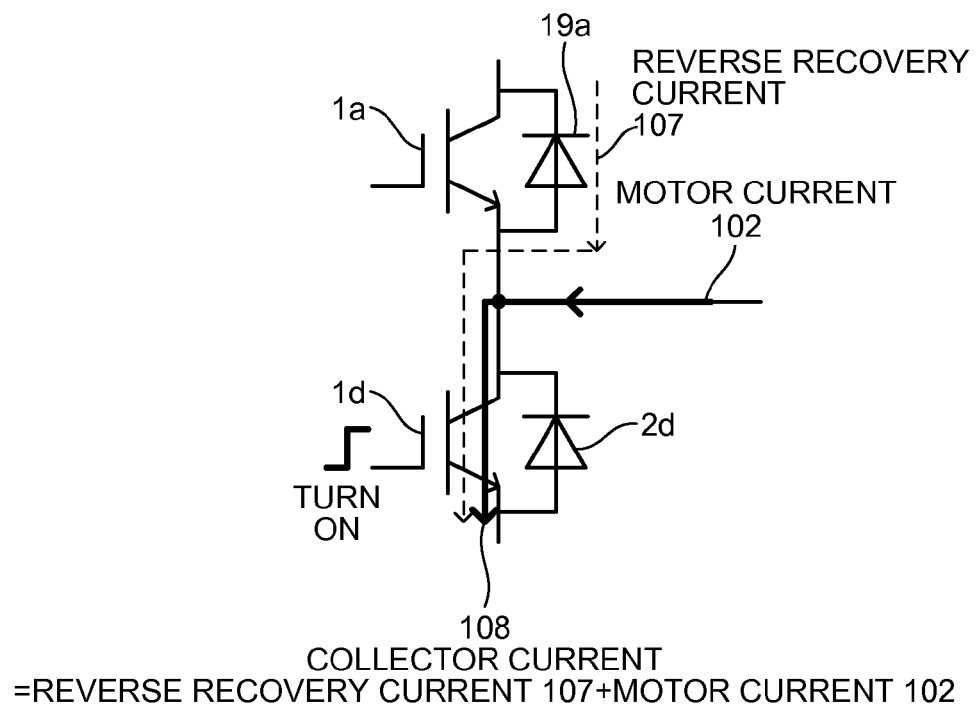

Meanwhile, FIGS. 5 to 8 depict various waveforms when the free wheeling diode 19a of the U-phase upper arm is configured with the SiC-SBD. To explain this configuration more specifically: FIG. 5 depicts a flow of a current in the first embodiment before the transistor 1d is turned on; FIG. 6 depicts a flow of a current in the first embodiment after the transistor 1d is turned on; FIG. 7 are explanatory diagrams of an increase of a turn-on loss in the first embodiment when the transistor 1d is turned on; and FIG. 8 depicts a loss reduction area according to the first embodiment as viewed from a three-phase current waveform.

In FIG. 5, when the transistor 1a is steadily turned on, the motor current 102 of the negative polarity flows through the free wheeling diode 19a being the SiC-SBD, as a forward direction current 106, similarly to the case shown in FIG. 2. When the transistor 1a is turned off from the state shown in FIG. 5 and the transistor 1d is turned on, a reverse recovery operation of the transistor 1d is started; however, because substantially no reverse recovery current flows due to the characteristics of the free wheeling diode 19a being the SiC-SBD, a reverse recovery current 107 indicated by a dashed line in FIG. 6 becomes a minute current, so that the reverse recovery loss becomes considerably low.

Although a collector current 108 of the transistor 1d includes the reverse recovery current 107 of the free wheeling diode 19a being the SiC-SBD, superimposed on the motor current 102, because the reverse recovery current 107 of the free wheeling diode 19a being the SiC-SBD, is minute, the collector current 108 of the transistor 1d can be decreased as compared to conventional cases. As a result, it is possible to reduce the turn-on loss of the transistor 1d.

As shown in FIG. 7(a), in the collector current 108 of the transistor 1d on which the reverse recovery current is superimposed, there is no large superimposing area such as that indicated by a hatched part in FIG. 4, due to the reduction of the reverse recovery current of the free wheeling diode 19a being the SiC-SBD. Therefore, the turn-on loss of the transistor 1d according to the first embodiment is smaller than that of the conventional case, as is clearly understood from a comparison between the waveforms shown in FIGS. 7(b) and 4(b).

In the configuration shown in FIG. 1, only the free wheeling diode in the U-phase upper arm employs a SiC-SBD, and thus a loss reduction effect can be obtained when the U-phase current flows as shown in FIGS. 5 and 6. Therefore, on the three-phase current waveform shown in FIG. 8, a negative area of the U-phase current indicated by a hatched part becomes the loss reduction area.

As explained above, with the power conversion apparatus according to the first embodiment, because it is configured to include at least one SiC-SBD and at least one Si-FRD as a diode other than the SiC-SBD, as the free wheeling diode, the conduction loss and the reverse recovery loss of the SiC-SBD can be reduced and the turn-on loss of the transistor arranged on a side of the inverse arm of the SiC-SBD can be reduced. Therefore, it is possible to secure the reliability on thermal destruction and to achieve the high efficiency while suppressing a cost increase.

Second Embodiment

While an effect of reducing the conduction loss, the reverse recovery loss, and the turn-on loss at the time of a normal operation has been explained in the first embodiment, in a second embodiment, an effect of reducing the conduction loss at the time of direct-current braking will be explained. The configuration of the power-conversion circuit unit 50 as the premise of the second embodiment is the same as that of the first embodiment.

Figure 9:
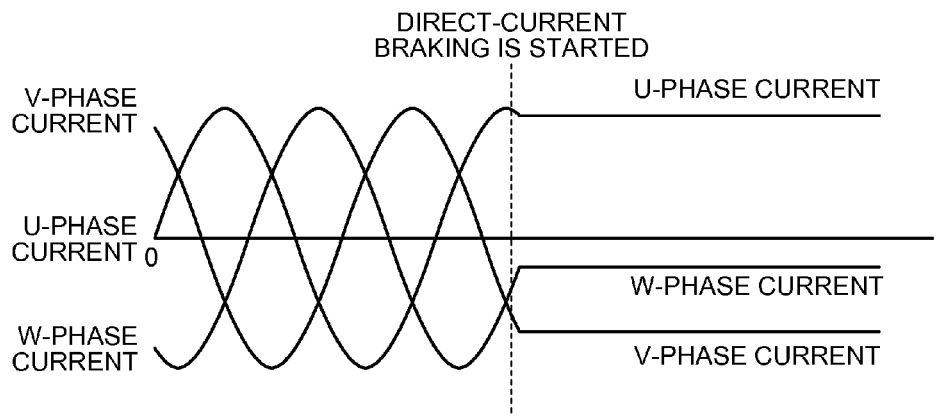
FIG. 9 is an explanatory diagram of a control timing in the conventional technique at the time of performing direct-current braking.

The direct-current braking is a control method of braking by stopping a rotation magnetic field of a motor by converting a three-phase alternate current into a direct current. FIG. 9 is an explanatory diagram of a control timing in the conventional technique at the time of performing direct-current braking. In FIG. 9, a position (a time) indicated by a dashed line represents a timing to start the direct-current braking. As shown in FIG. 9, because phases are fixed at the time when a direct-current braking command is input, the magnitude of the current of each phase becomes unbalanced, and the loss may be concentrated on one element, which may cause thermal destruction.

Figure 10:
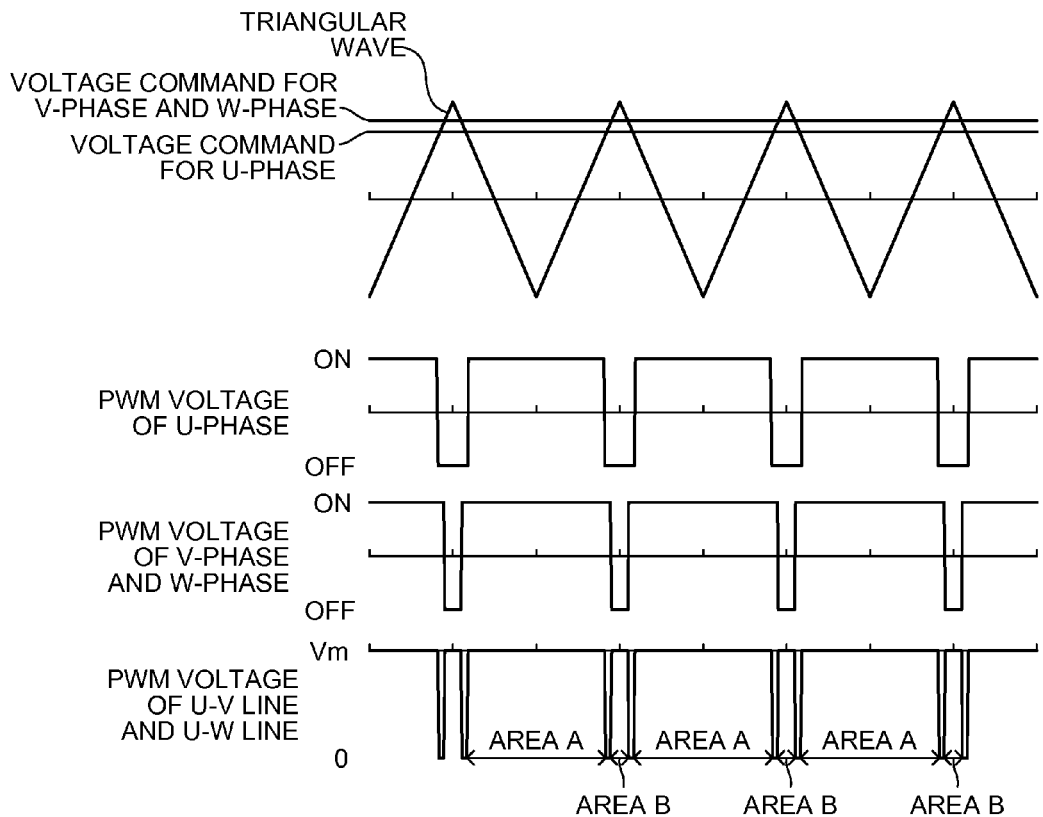
FIG. 10 depicts a PWM voltage command at the time of direct-current braking in a three-phase power conversion apparatus according to a second embodiment.
Figure 11:
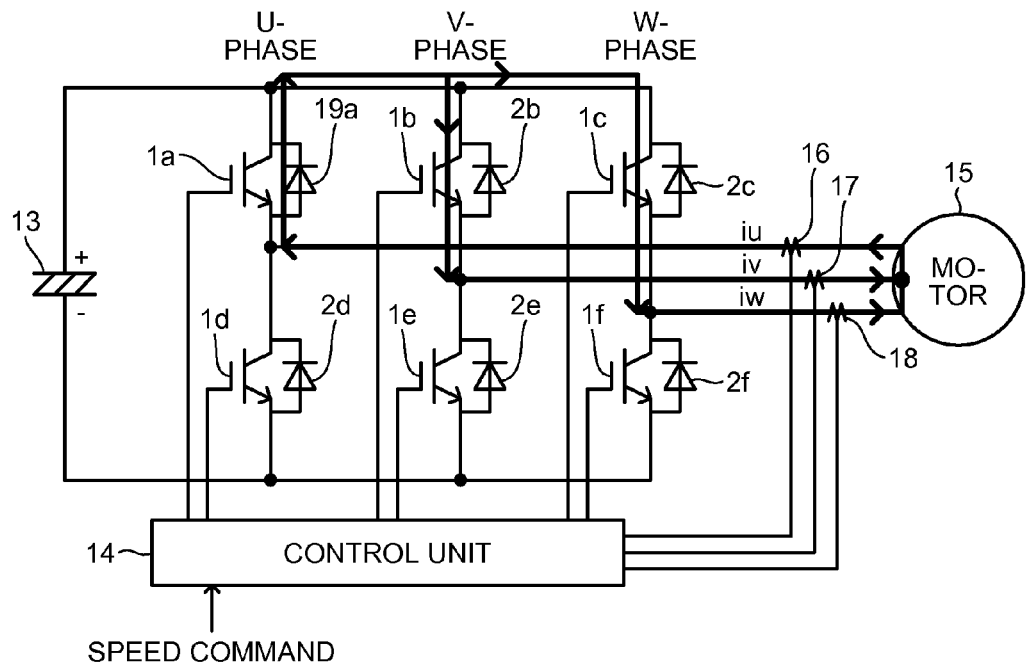
FIG. 11 depicts a path of a current flowing in an area A shown in FIG. 10.
Figure 12:
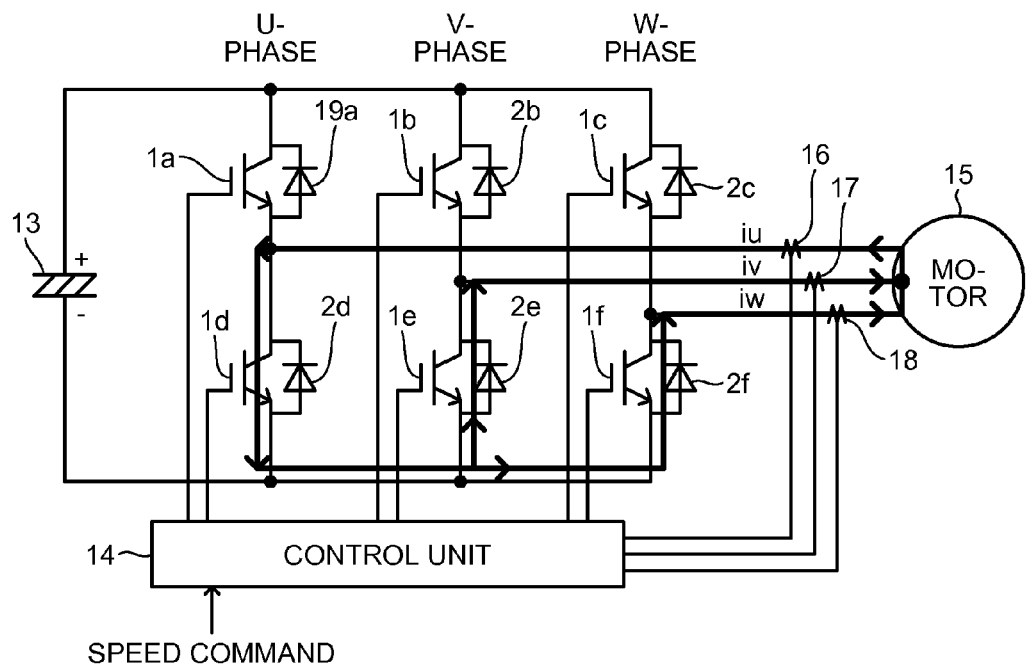
FIG. 12 depicts a path of a current flowing in an area B shown in FIG. 10.

Meanwhile, FIG. 10 depicts a PWM voltage command at the time of direct-current braking in a three-phase power conversion apparatus according to the second embodiment. FIG. 11 depicts a path of a current flowing in an area A shown in FIG. 10, and FIG. 12 depicts a path of a current flowing in an area B shown in FIG. 10.

In FIG. 10, a waveform on the top portion represents a comparison between a triangular wave and voltage commands for the U-phase, the V-phase, and the W-phase at the time of direct-current braking; a waveform on the middle portion represents a PWM voltage of the U-phase and PWM voltages of the V-phase and the W-phase generated depending on whether a difference of the triangular wave comparison is positive or negative; and a waveform on the bottom portion represents U-V line and U-W line PWM voltages. In the waveform on the bottom portion, a zero vector period in which all the PWM voltages of the U-phase, the V-phase, and the W-Phase are on is indicated as "area A"; and a zero vector period in which all the PWM voltages of the U-phase, the V-phase, and the W-phase are off is indicated as "area B".

Because the area A shown in FIG. 10 is a zero vector period in which all the PWM voltages of the U-phase, the V-phase, and the W-phase are on, the UVW-phases of the upper arm is short-circuited by the transistors 1a, 1b, and 1c and the free wheeling diodes 19a, 2b, and 2c, so that a current having no potential difference flows on a path indicated by a thick solid line shown in FIG. 11. Meanwhile, because the area B shown in FIG. 10 is a zero vector period in which all the PWM voltages of the U-phase, the V-phase, and the W-phase are off, the UVW-phases of the lower arm is short-circuited by the transistors 1d, 1e, and 1f and the free wheeling diodes 2d, 2e, and 2f, so that a current having no potential difference flows on a path indicated by a thick solid line shown in FIG. 12. The current paths shown in FIGS. 11 and 12 have electrically same meaning as a current path as viewed from the motor 15. Therefore, so long as the sum of the periods of the area A and the area B is equal, the proportion of the time width (period) of the area A and the area B may be changed without causing any problem.

Therefore, as shown in the top portion of FIG. 10, by setting the voltage command of each phase in a vicinity of a positive-side vertex of the triangular wave, it is possible to obtain the U-V line and U-W line PWM voltages as shown in the bottom portion. When such PWM voltages are generated, the period of the area A per cycle becomes longer. As a result, a conduction period of the free wheeling diode 2d being Si-FRD becomes shorter than a conduction period of the free wheeling diode 19a being the SiC-SBD, so that magnitude of the current that flows through the free wheeling diode 19a being the SiC-SBD having a low conduction loss can be higher than magnitude of the current that flows through the Si-FRD 2d having a larger conduction loss. With this operation, it is possible to reduce the conduction loss in the free wheeling diodes.

As described above, with the power conversion apparatus according to the second embodiment, any one of the free wheeling diodes of the upper arm or the lower arm in the voltage-type bridge circuit of an arbitrary phase is configured with a SiC-SBD. Other free wheeling diodes are configured with a diode other than a SiC-SBD, and a switching command is issued such that the zero vector period in which all the arms on a side where a SiC-SBD is arranged are turned on is longer than the zero vector period in which all the arms on a side where a SiC-SBD is not arranged are turned on. Thus it is possible to reduce the conduction loss in the free wheeling diodes.

Third Embodiment

While an effect of reducing the conduction loss in direct-current braking has been explained in the second embodiment, in a third embodiment, a control method for enhancing the effect of reducing a conduction loss in direct-current braking will be explained. The configuration of the power-conversion circuit unit 50 as the premise of the third embodiment is the same as that of the first embodiment.

In a conventional control method, as shown in FIG. 9, current phases are fixed at the time when direct-current braking is started. Therefore, the magnitude of the current is unbalanced for each phase, and the loss has been concentrated on a specific element. To handle this problem, as shown in FIG. 13, when a motor is driven by a three-phase alternate current, a direction in which a current starts to flow from the connecting portion of the upper and lower arms to the motor is set as a positive current, and the direct-current braking is configured to start at a phase in which the negative U-phase current is maximized. When the direct-current braking is started at such a timing, currents flowing through the V-phase and the W-phase can be set to a half of the current flowing through the U-phase, and thus the losses of the V-phase and the W-phase can be reduced to half, and it is possible to obtain a uniform loss. Although magnitude of the current flowing through the U-phase is higher than magnitude of the currents flowing through the V-phase and the W-phase, because the free wheeling diode of the U-phase is configured with a SiC-SBD, there is no increase of the conduction loss, the reverse recovery loss, and the turn-on loss of the inverse arm. With this control, the reliability against thermal destruction can be increased and the efficiency can be also increased.

FIG. 14 is another configuration example of the power conversion apparatus according to the third embodiment, in which free wheeling diodes of a pair of upper and lower arms in the same phase of the voltage-type bridge circuit are configured with SiC-SBDs. In the configuration example shown in FIG. 14, the free wheeling diodes 19a and 19d of the upper and lower arms of the U-phase are indicated as the SiC-SBDs, respectively. Other configurations are the same as those in FIG. 1.

Figure 15:
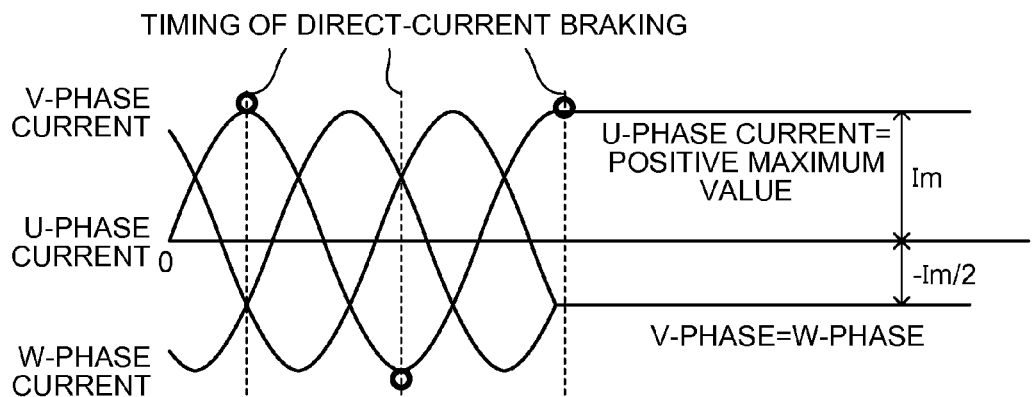
FIG. 15 is an explanatory diagram of a control timing at the time of performing preferred direct-current braking by using the power conversion apparatus shown in FIG. 14.

FIG. 15 is an explanatory diagram of a control timing at the time of performing preferred direct-current braking by using the power conversion apparatus shown in FIG. 14. As shown in FIG. 14, by configuring free wheeling diodes of the upper and lower arms of the U-phase with SiC-SBDs, the current of the negative polarity flowing from the motor 15 to the connection point of the upper and lower arms and the current of the positive polarity flowing from the connection point of the upper and lower arms to the motor 15 have the same principle of the loss on both polarities. Therefore, regarding the timing of the direct-current braking, it can be started not only at a timing of the negative maximum value of the U-phase current as shown in FIG. 13 but also at a timing of the positive maximum value of the U-phase current as shown in FIG. 15, from which the loss reduction effect can be obtained. Furthermore, with this control, an effect of shortening a transition time to the direct-current braking can be also obtained.

Figure 16:
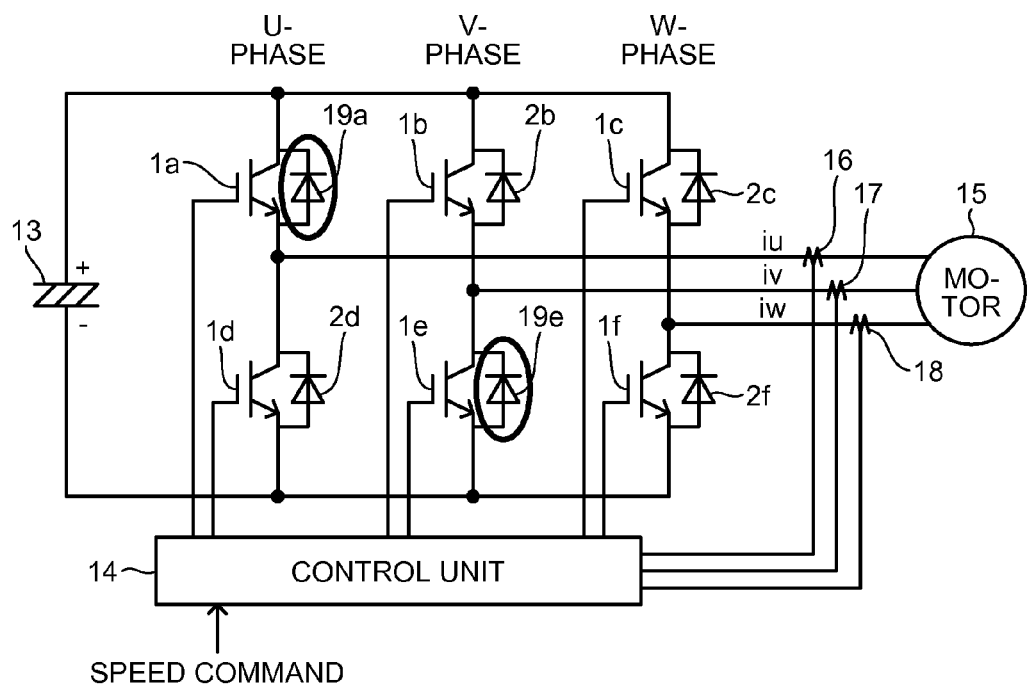
FIG. 16 is another configuration example of the power conversion apparatus according to the third embodiment, which is different from that shown in FIG. 14.

FIG. 16 is another configuration example of the power conversion apparatus according to the third embodiment, which is different from that shown in FIG. 14, in which a free wheeling diode of the upper arm or the lower arm in the voltage-type bridge circuit of one phase is configured with a SiC-SBD. A free wheeling diode of an arm that is different from the arm where a SiC-SBD is arranged of another phase that is different from the one phase, that is, an inverse arm of a facing arm (a lower arm if the arm where a SiC-SBD is arranged is an upper arm, or an upper arm if the arm where a SiC-SBD is arranged is a lower arm) is also configured with a SiC-SBD. In the configuration example shown in FIG. 16, the free wheeling diode 19a of the upper arm of the U-phase and the free wheeling diode 19e of the lower arm of the V-phase are indicated as the SiC-SBDs, respectively. Other configurations are the same as those in FIG. 1.

Figure 17:
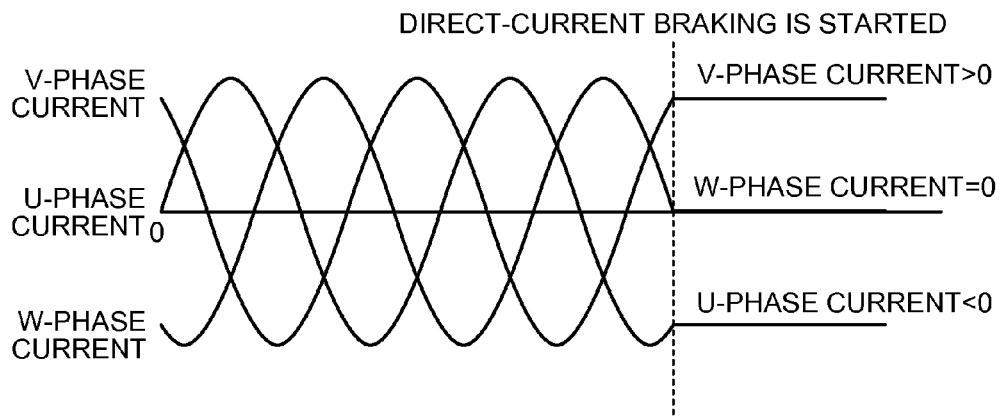
FIG. 17 is an explanatory diagram of a control timing at the time of performing preferred direct-current braking by using the power conversion apparatus shown in FIG. 16.

FIG. 17 is an explanatory diagram of a control timing at the time of performing preferred direct-current braking by using the power conversion apparatus shown in FIG. 16. As shown in FIG. 17, when the direct-current braking is started at a timing when the U-phase current has the negative polarity. The V-phase current has the positive polarity, and the W-phase current is zero, the W-phase current is zero and the U-phase current has the negative polarity, so that the U-phase current flows through the free wheeling diode 19a being the SiC-SBD on a side of the upper arm. And the V-phase current has the positive polarity, so that the V-phase current flows through the free wheeling diode 19e being the SiC-SBD on a side of the lower arm. Therefore, because the conduction loss due to the W-phase current becomes zero and the U-phase current and the V-phase current respectively flow through a SiC-SBD, it is possible to obtain a further reduction of the conduction loss.

Figure 18:
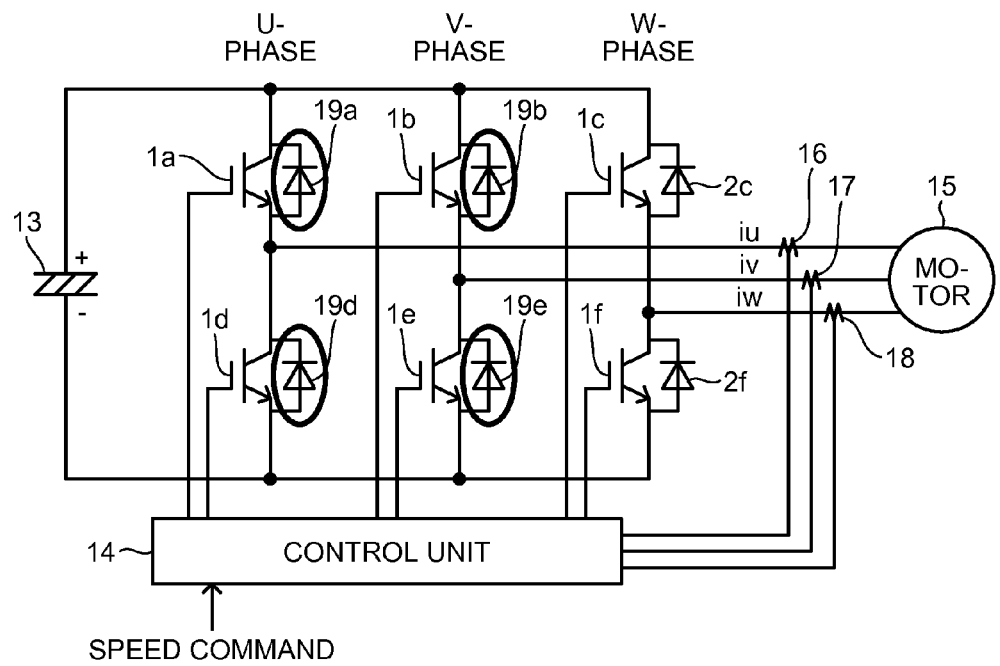
FIG. 18 is another configuration example of the power conversion apparatus according to the third embodiment, which is different from those shown in FIGS. 14 and 16.

FIG. 18 is another configuration example of the power conversion apparatus according to the third embodiment, which is different from those shown in FIGS. 14 and 16. In FIG. 18 the free wheeling diodes of the upper and lower arms of two phases in the voltage-type bridge circuit are configured with SiC-SBDs. In the configuration example shown in FIG. 18, free wheeling diodes 19*a* and 19*d* of the upper and lower arms of the U-phase are indicated as the SiC-SBDs, respectively, and free wheeling diodes 19*b* and 19*e* of the upper and lower arms of the V-phase are indicated as SiC-SBDs, respectively. Other configurations are the same as those in FIG. 1.

Figure 19:
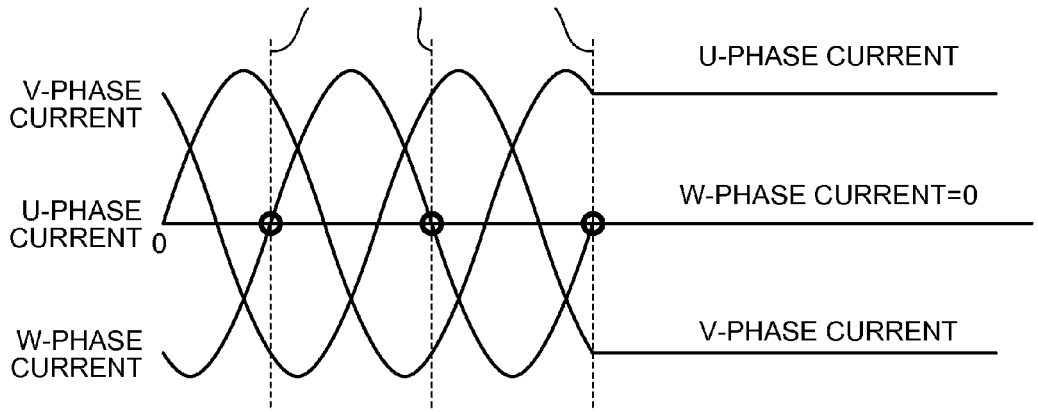
FIG. 19 is an explanatory diagram of a control timing at the time of performing preferred direct-current braking by using the power conversion apparatus shown in FIG. 18.

FIG. 19 is an explanatory diagram of a control timing at the time of performing preferred direct-current braking by using the power conversion apparatus shown in FIG. 18. As shown in FIG. 18, by configuring free wheeling diodes of the upper and lower arms of the U-phase and the V-phase with a SiC-SBD, the current of the negative polarity flowing from the motor 15 to the connection point of the upper and lower arms and the current of the positive polarity flowing from the connection point of the upper and lower arms to the motor 15 have the same principle of the loss on both polarities as that shown in FIG. 16. Therefore, the timing of the direct-current braking can be not only a case where the U-phase current has the negative polarity and the V-phase current has the positive polarity among the timings when the W-phase current becomes zero as shown in FIG. 17, but also a case where the U-phase current has the positive polarity and the V-phase has the negative polarity so long as the W-phase current is zero. That is, so long as the power conversion apparatus has the configuration shown in FIG. 18, any timing can be used so long as the W-phase current becomes zero. When the direct-current braking is started at such a timing, the loss in the direct-current braking can be reduced, and it is possible to obtain an effect of shorting the transition time to the direct-current braking.

Figure 20:
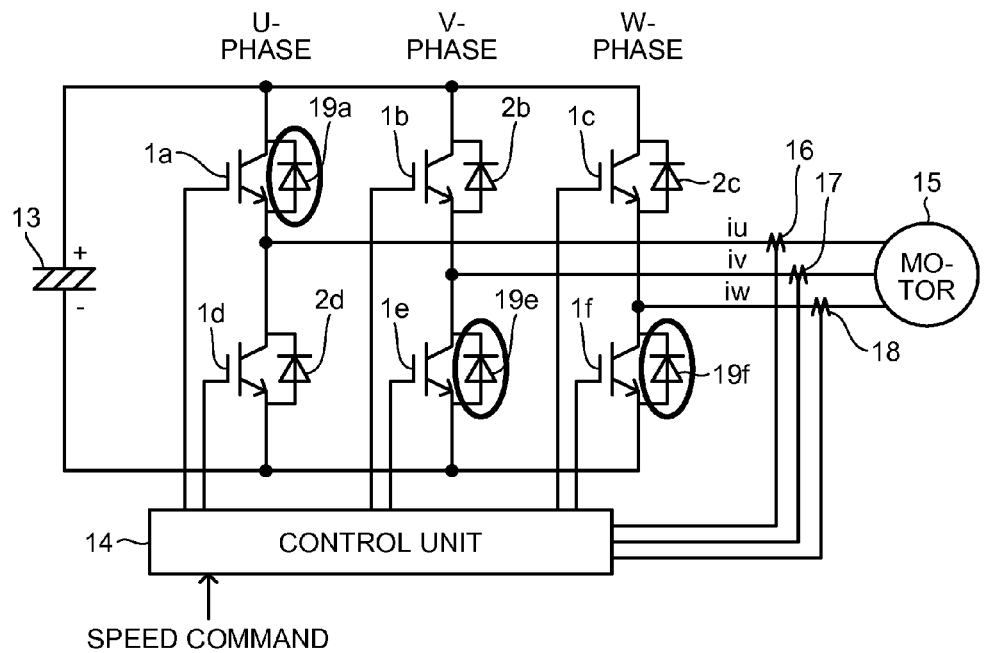
FIG. 20 is another configuration example of the power conversion apparatus according to the third embodiment, which is different from those shown in FIGS. 14, 16, and 18.

FIG. 20 is another configuration example of the power conversion apparatus according to the third embodiment, which is different from those shown in FIGS. 14, 16, and 18. In FIG. 20, a free wheeling diode of the upper arm or the lower arm in the voltage-type bridge circuit of one phase is configured with a SiC-SBD and free wheeling diodes of arms that are different from the arm where a SiC-SBD is arranged of the other two phases (lower arms if the arm where a SiC-SBD is arranged is an upper arm, or upper arms if the arm where a SiC-SBD is arranged is a lower arm) are also configured with a SiC-SBD. In the configuration example shown in FIG. 20, the free wheeling diode 19*a* of the upper arm of the U-phase, the free wheeling diode 19*e* of the lower arm of the V-phase, and the free wheeling diode 19*f* of the lower arm of the W-phase are indicated as the SiC-SBDs, respectively. Other configurations are the same as those in FIG. 1.

Figure 21:
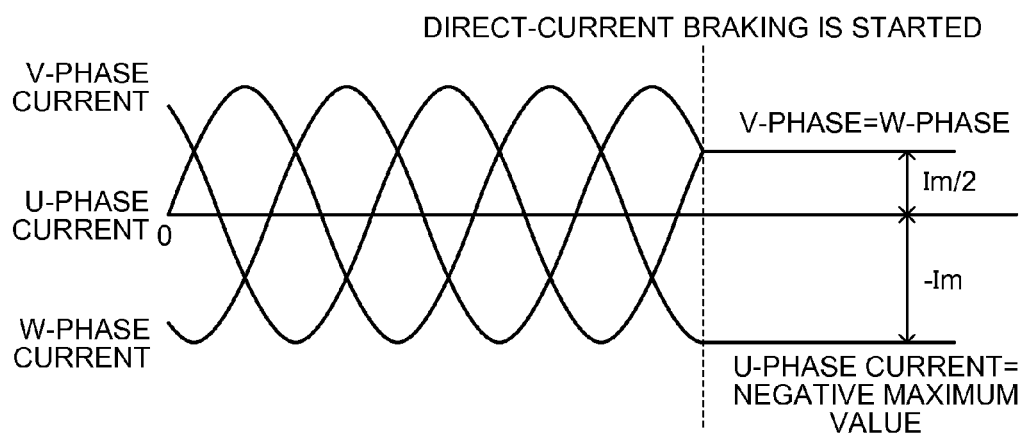
FIG. 21 is an explanatory diagram of a control timing at the time of performing preferred direct-current braking by using the power conversion apparatus shown in FIG. 20.

FIG. 21 is an explanatory diagram of a control timing at the time of performing preferred direct-current braking by using the power conversion apparatus shown in FIG. 20. As shown in FIG. 21, when the direct-current braking is started at the negative maximum value of the U-phase current; a current of ½ of the U-phase current flows to each of the V-phase and the W-phase in the forward direction. At this time, the U-phase current having the negative polarity flows through the free wheeling diode 19*a* being the SiC-SBD in the upper arm; the V-phase current having the positive polarity flows through the free wheeling diode 19*e* being the SiC-SBD in the lower arm; and the W-phase current having the positive polarity flows through the free wheeling diode 19*f* being the SiC-SBD in the lower arm. Meanwhile, no current flows through other free wheeling diodes that are not a SiC-SBD, and thus it is possible to further enhance the effect of reducing the loss in the direct-current braking.

Figure 22:
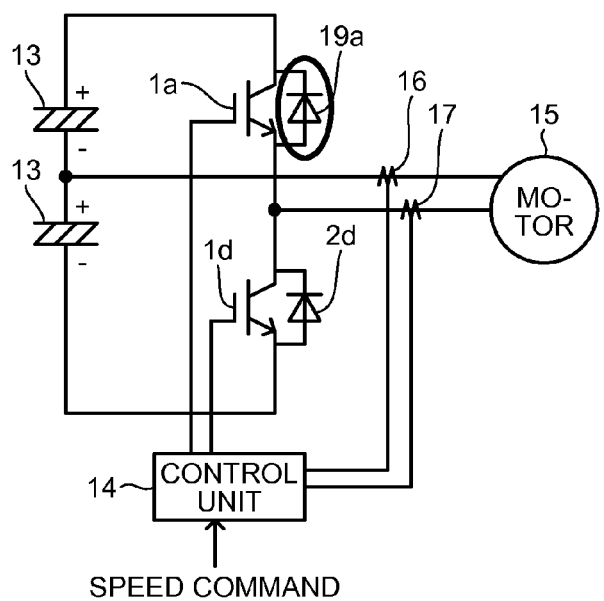
FIG. 22 is an example of a case where a SiC-SBD is applied to a single-phase power conversion apparatus having a half bridge configuration.

In the first to third embodiments, although the three-phase power conversion apparatus in which three voltage-type bridge circuits having an upper and lower arm configuration are connected in parallel is described as an example, the present invention is not limited to this three-phase power conversion apparatus. For example, the present invention can be also applied to a single-phase power conversion apparatus having a half bridge configuration as shown in FIG. 22. In the example shown in FIG. 22, the free wheeling diode of the upper arm is configured with the free wheeling diode 19*a* being the SiC-SBD, and when an operation is performed such that the transistor 1*d* of the lower arm is turned on after the current flows into the free wheeling diode 19*a* being the SiC-SBD, the loss reduction effect mentioned above can be obtained. Although the free wheeling diode of the upper arm is configured with a SiC-SBD in the configuration shown in FIG. 22, it is needless to mention that, by changing the upper and lower relationship, the free wheeling diode of the lower arm may be configured with a SiC-SBD.

Figure 23:
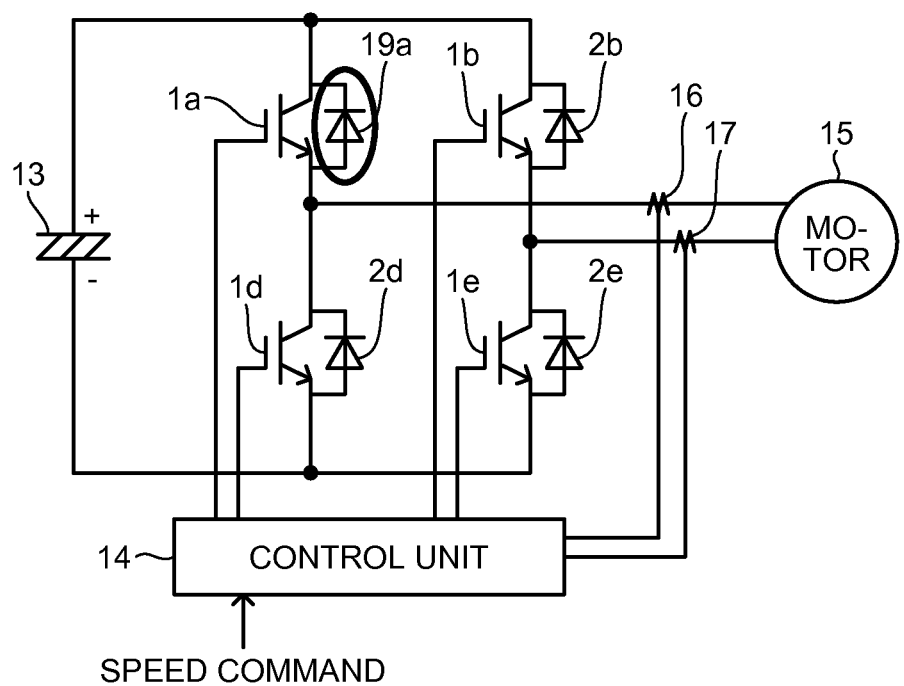
FIG. 23 is an example of a case where a SiC-SBD is applied to a single-phase power conversion apparatus having a full bridge configuration.

Furthermore, for example, the present invention can be also applied to a single-phase power conversion apparatus having a full bridge configuration as shown in FIG. 23. In the example shown in FIG. 23, the free wheeling diode 19*a* of the U-phase arm is configured with a SiC-SBD, and when an operation is performed such that the transistor 1*d* of the lower arm of the U-phase is turned on after the current flows into the free wheeling diode 19*a* being the SiC-SBD, the loss reduction effect mentioned above can be obtained. Although the free wheeling diode of the upper arm is configured with a SiC-SBD in the configuration shown in FIG. 23, the free wheeling diode of the lower arm of the U-phase may be configured with a SiC-SBD or any one of the upper arm of the V-phase or the lower arm of the V-phase may be configured with a SiC-SBD. Furthermore, as shown in another configuration example of the third embodiment, two to three free wheeling diodes among the four free wheeling diodes constituting the full bridge configuration may be configured with a SiC-SBD, from which effects identical to those of the third embodiment can be obtained.

As described above, with the power conversion apparatus according to the third embodiment, any one of the free wheeling diodes of the upper arm or the lower arm in the voltage-type bridge circuit of an arbitrary phase is configured with a SiC-SBD, and the other free wheeling diodes are configured with a diode other than a SiC-SBD. The current of the phase in which a SiC-SBD is arranged is set to a polarity that flows through a SiC-SBD, and the direct-current braking is started at a timing when the current flowing through the phase in which a SiC-SBD is arranged is larger in the absolute value than the current flowing through the phase in which a SiC-SBD is not arranged. Thus it is possible to reduce the conduction loss in the free wheeling diodes.

The free wheeling diode of the inverse arm of the phase in which a SiC-SBD is arranged in the voltage-type bridge circuit may be configured with a SiC-SBD, and the free wheeling diode of the inverse arm on a side where a SiC-SBD is arranged in the voltage-type bridge circuit of a phase among the phases where a SiC-SBD is not arranged may be configured with a SiC-SBD. Furthermore, the free wheeling diodes of the upper and lower arms in the voltage-type bridge circuit of any two phases can be configured with a SiC-SBD and the free wheeling diodes of the upper and lower arms in the voltage-type bridge circuit of the other phase may be configured with a diode other than a SiC-SBD. In addition, the free wheeling diode of the upper arm or the lower arm in the voltage-type bridge circuit of a first phase may be configured with a SiC-SBD and the free wheeling diodes of the inverse arms on a side where the SiC-SBD of the first phase is arranged in the voltage-type bridge circuits of a second phase and a third phase may be configured with a SiC-SBD. With these configurations, various variations can be created regarding the direct-current braking, and thus it is possible to enhance the effect of reducing the conduction loss in the free wheeling diodes.

In the first to third embodiments, although a configuration in which one free wheeling diode among six arms constituting the U-phase to the W-phase is configured with a SiC-SBD has been disclosed, the present invention is not limited to a SiC-SBD. SiC (silicon carbide) is an example of a semiconductor referred to as "wide bandgap semiconductor" due to the characteristic that the bandgap of SiC is wider than that of Si (silicon). Other than SiC, for example, a gallium nitride-based material (GaN) or a semiconductor formed by using diamond (C) also belong to the wide bandgap semiconductor, and the characteristics thereof has many features that are similar to those of SiC. Therefore, configurations using other wide bandgap semiconductors other than SiC also belong to the gist of the present invention.

A diode element formed by such a wide bandgap semiconductor has a high withstand voltage and a high tolerable current density, thereby enabling the diode element to be downsized, and thus a semiconductor element module can be downsized by employing the downsized diode element.

In addition, an element formed by a wide bandgap semiconductor has a high thermal resistance, thereby enabling a heat sink to be downsized, and a cooler or a radiator for cooling the semiconductor module can be downsized.

INDUSTRIAL APPLICABILITY

As described above, the power conversion apparatus according to the present invention is useful as an invention that can secure the reliability on thermal destruction and achieve high efficiency while suppressing a cost increase.

REFERENCE SIGNS LIST 1a to 1f transistor
2a to 2f free wheeling diode (Si-FRD)
13 smoothing capacitor
14 control unit
15 motor
16 to 18 current sensor
19a to 19f free wheeling diode (SiC-SBD)
50 power-conversion circuit unit
100 power conversion apparatus

The invention claimed is:

1. A power conversion apparatus comprising a power-conversion circuit unit that includes at least two voltage-type bridge circuits of an upper and lower arm configuration including switching elements connected in series, each of the switching elements including a transistor and a free wheel diode connected to the transistor in inverse parallel, wherein
each of the voltage-type bridge circuits is configured to include one of:
a SiC-Schottky-Barrier Diode (SiC-SBD) in both upper and lower arms, as a first configuration of the free wheel diodes;
a SiC-SBD only in the upper arm, as a second configuration of the free wheel diodes;
a SiC-SBD only in the lower arm, as a third configuration of the free wheel diodes; and
a diode other than the SiC-SBD in both the upper and lower arms, as a fourth configuration of the free wheel diodes; and
the power-conversion circuit unit is configured by combining at least two different configurations among said first to fourth configurations for the voltage-type bridge circuits.

2. The power conversion apparatus according to claim 1, wherein the diode other than the SiC-SBD includes a Si-Fast Recovery Diode (Si-FRD).

3. The power conversion apparatus according to claim 1, further comprising:
a controller configured to set voltage commands for U-phase, V-phase, and W-phase in a vicinity of a positive-side vertex of a triangular wave when a switching command for the switching elements is determined based on a difference between the voltages commands and the triangular wave.

4. The power conversion apparatus according to claim 1, wherein the voltage commands are set in the vicinity of the positive-side vertex of the triangular wave so that a conduction period of the SiC-SBD becomes shorter than a conduction period of all switching elements of an arm on a side where the SiC-SBD is not arranged.

5. A three-phase power conversion apparatus comprising a power-conversion circuit unit that includes three voltage-type bridge circuits of an upper and lower arm configuration, the voltage-type bridge circuits being connected in parallel and including switching elements connected in series, each of the switching elements including a transistor and a free wheeling diode connected to the transistor in inverse parallel, wherein
a free wheeling diode of an upper arm or a lower arm in the voltage-type bridge circuit of an arbitrary phase is configured with a SiC-SBD, and other free wheeling diodes are configured with a diode other than a SiC-SBD.

6. The power conversion apparatus according to claim 5, wherein when direct-current braking is performed on a load that is connected to the power-conversion circuit unit, a current of a phase in which the SiC-SBD is arranged is set to a polarity that flows through the SiC-SBD, and the direct-current braking is started at a timing when a current flowing through the phase in which the SiC-SBD is arranged is larger in an absolute value than a current flowing through a phase in which the SiC-SBD is not arranged.

7. The power conversion apparatus according to claim 6, wherein a free wheeling diode of an inverse arm in the voltage-type bridge circuit of the phase in which the SiC-SBD is arranged is configured with a SiC-SBD.

8. The power conversion apparatus according to claim 6, wherein a free wheeling diode of an inverse arm on a side where the SiC-SBD is arranged in the voltage-type bridge circuit of one phase among phases where the SiC-SBD is not arranged is configured with a SiC-SBD.

9. The power conversion apparatus according to claim 8, wherein the direct-current braking is started at a timing when a current flowing through the phase in which the SiC-SBD is not arranged becomes zero.

10. The power conversion apparatus according to claim 5, wherein when direct-current braking is performed on a load that is connected to the power-conversion circuit unit, a switching command is issued such that a zero vector period in which all switching elements of an arm on a side where the SiC-SBD is arranged are turned on is longer than a zero vector period in which all switching elements of an arm on a side where the SiC-SBD is not arranged are turned on.

11. The power conversion apparatus according to claim 5, wherein the diode other than the SiC-SBD is a Si-Fast Recovery Diode (Si-FRD).

12. A three-phase power conversion apparatus comprising a power-conversion circuit unit that includes three voltage-type bridge circuits of an upper and lower arm configuration, the voltage-type bridge circuits being connected in parallel and including switching elements connected in series, each of the switching elements including a transistor and a free wheeling diode connected to the transistor in inverse parallel, wherein respective free wheeling diodes of upper and lower arms in the voltage-type bridge circuits of two arbitrary phases are configured with a SiC-Schottky-Barrier Diode (SiC-SBD), and free wheeling diodes of upper and lower arms in the voltage-type bridge circuits of one remaining phase are configured with a diode other than a SiC-SBD.

13. The power conversion apparatus according to claim 12, wherein the direct-current braking is started at a timing when a current flowing through the phase in which the SiC-SBD is not arranged becomes zero.

14. The power conversion apparatus according to claim 12, wherein the diode other than the SiC-SBD is a Si-Fast Recovery Diode (Si-FRD).

15. A three-phase power conversion apparatus comprising a power-conversion circuit unit that includes three voltage-type bridge circuits of an upper and lower arm configuration, the voltage-type bridge circuits being connected in parallel and including switching elements connected in series, each of the switching elements including a transistor and a free wheeling diode connected to the transistor in inverse parallel, wherein a free wheeling diode of an upper arm or a lower arm in the voltage-type bridge circuit of an arbitrary first phase is configured with a SiC-Schottky-Barrier Diode (SiC-SBD), and respective free wheeling diodes of inverse arms on a side where the SiC-SBD of the first phase is arranged in the voltage-type bridge circuits of second and third phases are configured with a SiC-SBD.

16. The power conversion apparatus according to claim 15, wherein when direct-current braking is performed on a load that is connected to the power-conversion circuit unit, a current of the first phase is set to a polarity that flows through the SiC-SBD of the first phase, and the direct-current braking is started at a timing when a current flowing through the first phase is larger in an absolute value than a current flowing through the second and third phases.

17. The power conversion apparatus according to claim 16, wherein the timing of starting the direct-current braking is a maximum value of the current flowing through the first phase.

18. The power conversion apparatus according to claim 15, wherein the diode other than the SiC-SBD is a Si-Fast Recovery Diode (Si-FRD).

* * * * *